(12) United States Patent
Rolfes et al.

(10) Patent No.: US 8,522,669 B1
(45) Date of Patent: Sep. 3, 2013

(54) SINGLE CUP POD HOLDER

(76) Inventors: Patrick J. Rolfes, Corona Del Mar, CA (US); John Guy Cazort, II, Corona Del Mar, CA (US)

( * ) Notice: Subject to any disclaimer, the term of this patent is extended or adjusted under 35 U.S.C. 154(b) by 171 days.

(21) Appl. No.: 12/931,372

(22) Filed: Feb. 1, 2011

(51) Int. Cl.
  *A47J 31/06* (2006.01)
  *A47G 19/14* (2006.01)
  *B65B 29/02* (2006.01)
  *B65D 85/78* (2006.01)

(52) U.S. Cl.
  USPC ............... 99/295; 99/323; 99/289 R; 426/77; 426/78; 426/79; 426/80; 426/132

(58) Field of Classification Search
  USPC ............... 99/295, 323, 289 R; 426/77–84, 426/132
  See application file for complete search history.

(56) References Cited

U.S. PATENT DOCUMENTS

| | | | | |
|---|---|---|---|---|
| 3,935,318 A * | 1/1976 | Mihailide | ........................ | 426/80 |
| 3,975,996 A * | 8/1976 | Vitous | ............................ | 99/295 |
| 4,429,623 A * | 2/1984 | Illy | ................................ | 99/295 |
| 5,287,797 A * | 2/1994 | Grykiewicz et al. | ............ | 99/295 |
| 5,325,765 A | 7/1994 | Sylvan et al. | | |
| 5,424,083 A * | 6/1995 | Lozito | ............................. | 426/82 |
| 5,913,964 A * | 6/1999 | Melton | ........................... | 99/322 |
| 5,927,179 A * | 7/1999 | Mordini et al. | ................. | 99/304 |
| 5,947,004 A * | 9/1999 | Huang | ............................. | 99/299 |
| 6,182,554 B1 | 2/2001 | Beaulieu et al. | | |
| D474,111 S | 5/2003 | Lazaris | | |
| 6,645,537 B2 | 11/2003 | Sweeney et al. | | |
| 7,243,598 B2 * | 7/2007 | Halliday et al. | ................ | 99/295 |
| 7,487,712 B2 * | 2/2009 | Bowden et al. | ................. | 99/295 |
| 7,513,192 B2 | 4/2009 | Sullivan et al. | | |
| 7,523,695 B2 | 4/2009 | Streeter et al. | | |
| 2006/0180030 A1 * | 8/2006 | Bates et al. | ..................... | 99/323 |
| 2007/0084352 A1 * | 4/2007 | Yuen et al. | ...................... | 99/295 |
| 2009/0229470 A1 * | 9/2009 | Dorfmueller | ................... | 99/295 |

* cited by examiner

*Primary Examiner* — Joseph M Pelham
*Assistant Examiner* — Gyounghyun Bae
(74) *Attorney, Agent, or Firm* — Gordon K. Anderson

(57) ABSTRACT

A pod holder for brewing a single cup beverage with infused heated water consist of a holder body having an open top and a base with an egress hole. A body inner cup, to with a keyhole shaped opening in the bottom, is placed within the holder body. A pod ejector pin extend through both the inner cup keyhole shaped opening and the holder body egress hole and protrudes beneath. A single cup pod is manually compressed into the inner cup, and a lid is attached to the body. The lid has an integral water inlet hollow duct with a pod cushion, permitting the cushion to press against the pod without piercing the pod cover, such that when hot water is introduced into the pod the water seeps through the pod's contents and a beverage is brewed. The brewed liquid drains through the inner cup and body and is discharged into a cup beneath, with the spent pod expelled when the lid is removed and the ejector pin is manually depressed.

11 Claims, 3 Drawing Sheets

SINGLE CUP POD HOLDER

TECHNICAL FIELD

The present invention relates to single cup beverage holders in general. More specifically to a holder for brewing a single cup beverage with infused heated water utilizing a beverage pod.

BACKGROUND OF THE INVENTION

Previously, many types of holders, beverage cartridge receivers and containers have been used in endeavoring to provide an effective means to produce a single cup beverage.

The prior art listed below did not disclose patents that possess any of the novelty of the instant invention; however the following U.S. patents are considered related:

| Pat. No. | Inventor | Issue Date |
| --- | --- | --- |
| 7,523,695 B2 | Streeter et al. | Apr. 28, 2009 |
| 7,513,192 B2 | Sullivan et al. | Apr. 7, 2009 |
| 6,645,537 B2 | Sweeney et al. | Nov. 11, 2003 |
| 6,182,554 B1 | Beaulieu et al. | Feb. 6, 2001 |
| 5,325,765 | Sylvan et al. | Jul. 5, 1994 |
| D474,111 S | Lazaris | May 6, 2003 |

Streeter et al. in U.S. Pat. No. 7,523,695 B2 teaches a system for dispensing a metered volume of heated water to the brew chamber of a single serve beverage dispenser. The system includes: a storage tank for containing a supply of unheated water, a dispensing tank, and a delivery line communicating with the brew chamber and with the dispensing tank at an intermediate level demarcating the interior of the dispensing tank into upper and lower compartments. The system also includes a vent valve, a supply line connecting the storage tank to the lower compartment and an air pump for the upper compartment. A heater heats the water and a water pump delivers water to the lower compartment. Sensors control level and temperature of the water to the brew chamber.

U.S. Pat. No. 7,513,192 B2 issued to Sullivan et al. is for a beverage forming device with an opening and closing mechanism for use with a beverage single serve cartridge receiver. A first linkage fixed to an actuator is in contact with a second linkage fixed to a frame, or the like. Movements of the actuator cause movement relative to each other for the opening and closing positions.

Sweeney et al. in U.S. Pat. No. 6,645,537 B2 disclose a beverage filter cartridge having a cup-shaped outer container with a bottom and a side wall extending upwardly from the bottom wall to a circular rim surrounding an upper opening. A beverage medium is stored in a first chamber and a cover joins the side wall at the rim. The cover is piercable to accommodate an injection of liquid to produce a beverage and the bottom is pieceable for outflow.

Beaulieu et al. in U.S. Pat. No. 6,182,554 B1 teaches a beverage cup holder which is provided with an ejection mechanism to automatically dislodge a spent beverage container when the lid is opened. The holder is mounted on externally protruding trunnions for pivotal movement. A lid has an arm that co-acts with a pawl to automatically eject the cartridge.

U.S. Pat. No. 5,325,765 issued to Sylvan et al. is for a beverage filter cartridge with an impermeable piercable base having a predetermined shape and opening at one end. A self-supporting filter element in located in the base having a form different and smaller than the shape of the base and divided into two sealed chambers one for storage and the other empty. A cover engages the open base.

Lazaris in U.S. Design Pat. D474,111 S illustrates a cup shaped container.

BRIEF SUMMARY OF THE INVENTION

The most popular prior art in field of single cup coffee brewing utilize a K-Cup® produced and marketed by Keurig Inc. of Reading Mass. a subsidiary of Green Mountain Coffee Roasters Inc. The K-Cup® is a disposable thermoplastic cup having a coating layer of polyethylene, a filter paper interior pouch holding the coffee dry beverage medium inside and an aluminum foil top cover. This product is convenient and popular as the manufacturer reported that 2.5 million K-Cup®'s were brewed every day in 2009. However the entire cup must be thrown away after use as the top cover and bottom of the cup have been pierced to allow hot water to enter through the top cover and flow through the cup for brewing and then exit through the hole in the bottom of the cup. The magnitude of the usage of this product creates a gigantic problem as the K-Cup®, as assembled, is environmentally unfriendly and separating the plastic and aluminum parts for recycling is totally impractical.

The manufacturer of the K-Cup® later introduced an alternative using a reusable coffee filter basket in a filter holder with a lid employing the user own drip coffee which is marketed under the name My K-Cup®, however the convenience of use is lost as the grounds must be thrown away separately and the filter basket cleaned after each use. It is therefore the primary object of the invention to provide an environmental friendly method of beverage brewing using a well known product, presently in the market, known as a "pod" which houses the coffee, or another dry beverage medium, in a permeable cover, both of which are small and biodegradable. The invention is convenient as the user simply places the pod in an inner cup pressing it home with ones finger and then replaces the lid. When the beverage is brewed the pod is expelled by removing the lid and manually depressing the ejector pin on the bottom of the housing.

An important object is that the invention may be used by a number of existing brewers that are already on the market such as those manufactured by Keurig, Beville, Mr. Coffee®, Cuisinart® etc. as the holder for the beverage media is basically interchangeable.

Another object of the invention is that the seal on the pod is not broken or pierced as is the top and bottom of the K-Cup®, thereby eliminating any liquid dripping after the pod is removed and discarded.

Still another object of the invention is in its flexibility as it may be used with simple basic equipment, since only heated water is required to brew the beverage. As an example, any uncomplicated device may be used that would retain the holder over a cup with metered amount of hot water poured into the entry hole on top of the lid.

A further object of the invention is its economy compared to the prior art, as a pod is less expensive to manufacture since it only utilizes the brew media contained in a permeable cover whereas the K-Cup® requires two additional elements, the plastic cup and the aluminum lid and further the specialized equipment necessary to assemble and attach the lid to the cup.

Yet another object of the invention is the ease of cleaning as the invention consists of only four basic parts, a holder body, an inner cup, an ejector pin and a lid. All of which are made of thermoplastic and easily cleaned by hand or in a dishwasher. The inner cup is removed by separating it from the body and the ejector pin is removed from the inner cup by rotating the head until the index mark lines up with the short rib in the inner cup. Only occasional cleaning is required the same as the prior art described above.

A finally, the instant invention utilizes a soft rubber like O-seal to force hot water from the top through the permeable cover flowing around the pod to the exit. Whereas the prior art of the Keurig brewer makes a seal with the K-Cup® using a needle penetrating the foil top forcing the hot water though the coffee media exiting through a hollow needle penetrating the bottom.

These and other objects and advantages of the present invention will become apparent from the subsequent detailed description of the preferred embodiment and the appended claims taken in conjunction with the accompanying drawings.

DETAILED DESCRIPTION OF THE INVENTION

Figure 1:
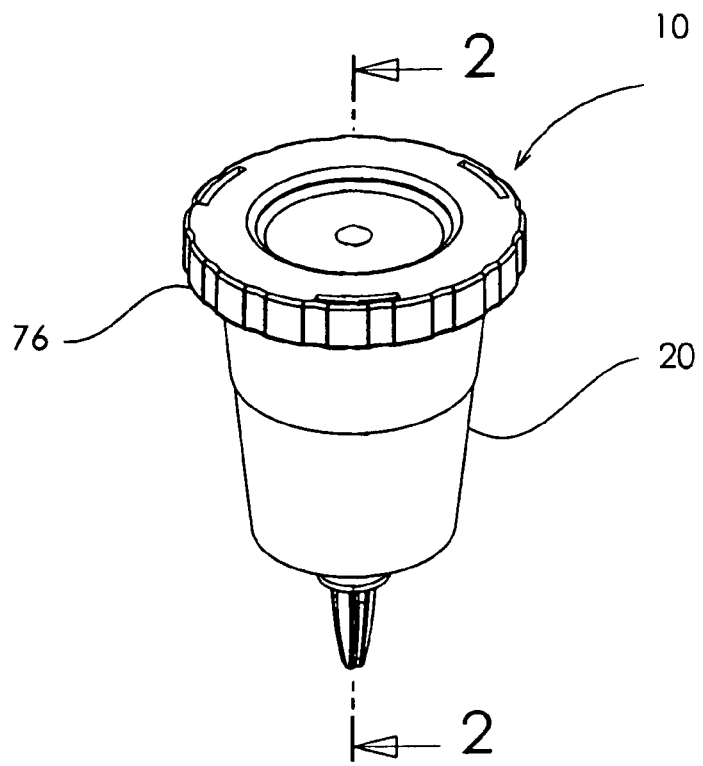
FIG. 1 is an isometric view of the single-cup pod holder in the preferred embodiment.
Figure 17:
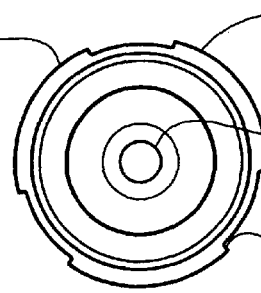
FIG. 17 is a top elevation view of the holder body in the preferred embodiment.
Figure 18:
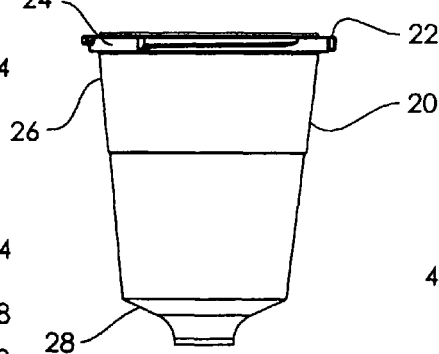
FIG. 18 is a front elevation view of the holder body in the preferred embodiment.
Figure 12:
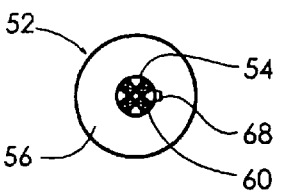
FIG. 12 is a bottom elevation view of the pod ejector pin in the preferred embodiment.
Figure 16:
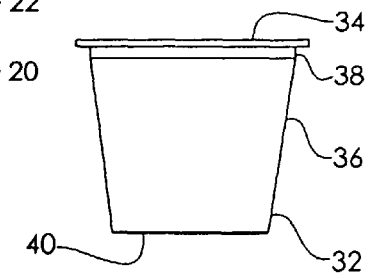
FIG. 16 is a front elevation view of the body inner cup in the preferred embodiment.

The best mode for carrying out the invention is presented in terms of a preferred embodiment of a single-cup pod holder 10. This preferred embodiment is shown in FIGS. 1 thorough 18 and is comprised of a holder body 20 having a flange 22 on an open top with a plurality of notches 24 equally spaced on the periphery. The body 20 is tapered from an upper surface 26 to a converging cone shaped base 28, as shown in FIG. 18. The base has a centrally positioned egress hole 30 which has an unobstructed opening there through, as illustrated in FIG. 17. The holder body 20 is also depicted in FIGS. 1-3, as well as 17 and 18.

Figure 2:
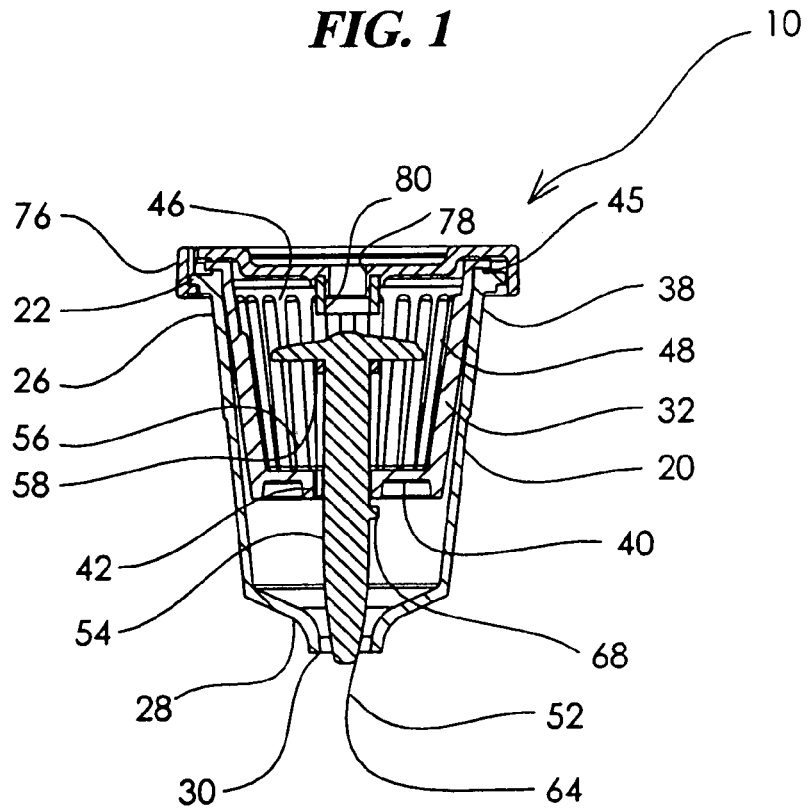
FIG. 2 is a cross sectional view taken along lines 2-2 of FIG. 1.
Figure 3:
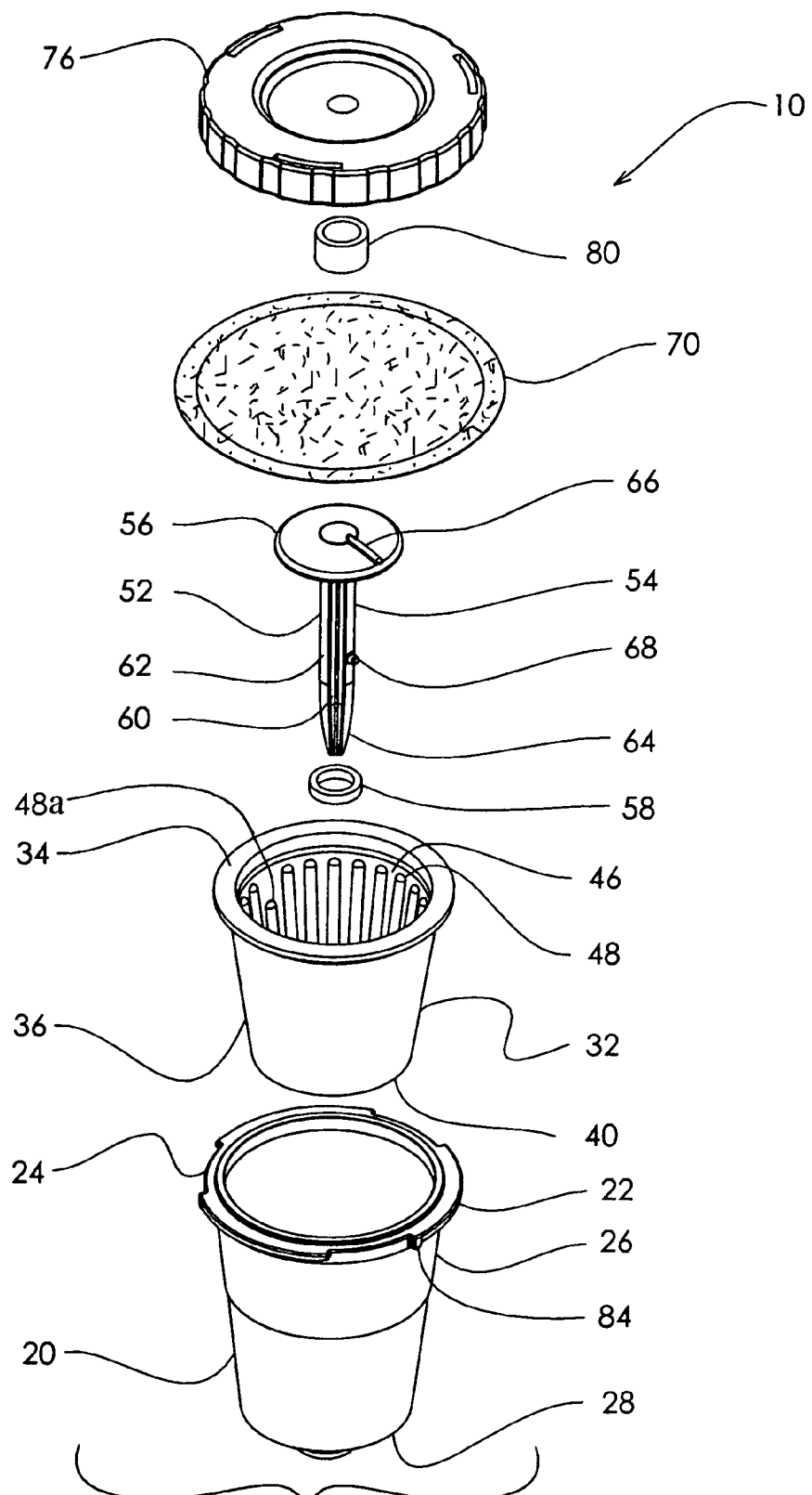
FIG. 3 is an exploded view of the individual elements of the single-cup pod holder in the preferred embodiment.
Figure 15:
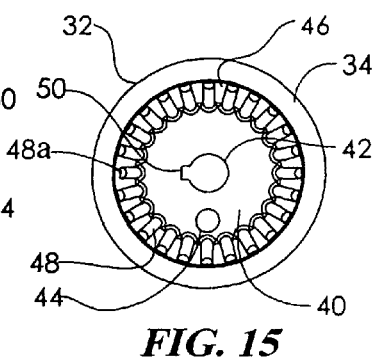
FIG. 15 is a top elevation view of the body inner cup in the preferred embodiment.
Figure 11:
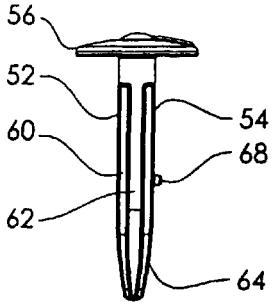
FIG. 11 is a side elevation view of the pod ejector pin in the preferred embodiment.

A body inner cup 32, shown in FIGS. 2, 3, 15 and 16, is disposed within the holder body 20, with the inner cup 32 having a flanged open top 34 and diametrically tapered sides 36. The sides 36, depicted in FIG. 16, have a configuration that complements the inside surface of the holder body 20 in a tight fit at the upper portion 38 of the body's inside surface. The body inner cup 32 has a flat bottom surface 40 containing a centrally located keyhole shaped opening 42 and a drain hole 44 for draining brewed liquid into the holder body 20, as illustrated in FIG. 15. The holder body flange 22 contains an inner radial raised seat 45 that is configured to mate with the body inner cup flanged open top 34, as illustrated in FIG. 2.

The body inner cup 32 inside surface 46 incorporates a plurality of integral ribs 48, again depicted in FIG. 15, which extend from the flanged open top 34 to the surface of the bottom 40, creating a fluid flow path between the ribs 48. One of the plurality of ribs 48, designated as the short rib 48a, extends slightly beneath the inner cup open top 34, for indicating a position relative to the outwardly extending portion 50 of the keyhole shaped opening 42 on the bottom 40.

Figure 13:
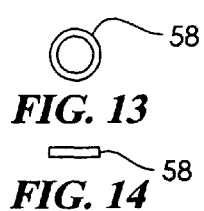
FIG. 13 is a top elevation view of the pod ejector pin spacer in the preferred embodiment.
Figure 14:
FIG. 14 is a side elevation view of the pod ejector pin spacer in the preferred embodiment.

A pod ejector pin 52, illustrated in FIGS. 1-3 and 10-12, include a shaft 54 and a head 56 with an ejector pin spacer 58, shown in FIGS. 13 and 14 consisting of hollow tube of resilient material, positioned on the shaft 54 contiguously engaging the head 56. The shaft 54 is positioned thru both the body inner cup keyhole shaped opening 42 and the holder body egress hole 30, with the ejector pin spacer 58 resting on the inner cup bottom 40.

The pod ejector pin shaft 54 contains a plurality of grooves 60 on an outside surface 62, preferably four, providing a flow path for brewed liquid to pass through when the ejector pin 52 is positioned within the inner cup keyhole shaped opening 42 and the holder body egress hole 30. The pod ejector pin shaft 54 includes a tapered shank blunt end 64 creating a splatter free flow for brewed liquid when flowing, without restraint, into a cup below the pod holder 10, and for user comfort when manually ejecting a pod. The ejector pin shaft 54 includes an indexing mark 66, in the form of a raised line formed integrally on the top portion of the head 56, and the shaft 54 shank includes an outwardly extending protrusion 68 for retention of the pin 52 between the inner cup 32 and the holder body 20. The outwardly extending protrusion 68 has a configuration that permits removal through the centrally located keyhole shaped opening 42 in the body inner cup 32 and retention when rotated.

Figure 8:
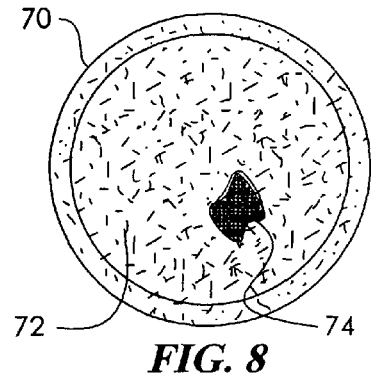
FIG. 8 is a top elevation view of a conventional single cup pod.
Figure 9:
FIG. 9 is a side elevation view of a conventional single cup pod.
Figure 10:
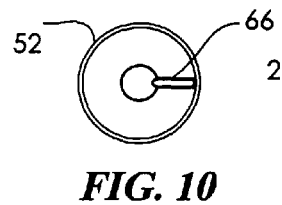
FIG. 10 is a top elevation view of the holder body lid in the preferred embodiment.

A single cup pod 70, depicted in FIGS. 8 and 9, is manually compressed into the body inner cup 32 with the pod 70 consisting of a permeable cover 72 with a dry beverage medium 74 inside. The permeable cover 72 of the pod 70 is filter paper consisting of a porous material, well known in the art and in use for decades throughout the world. The beverage medium 74 may be of any type suitable for the application such as a myriad of blends of coffee along with added flavors and strength, coffee substitutes, tea, herbs in all combinations and any other brewable medium. FIGS. 3, 8 and 9 illustrate a typical pod 70 however the cross section of FIG. 2 has omitted the pod within the inner cup 32 for clarity.

Figure 4:
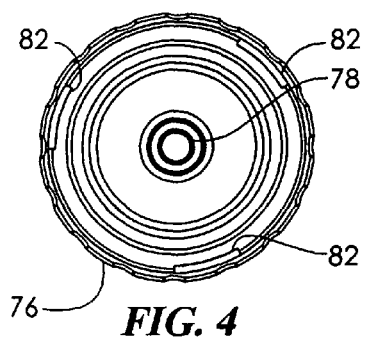
FIG. 4 is a bottom, or underside, view of the holder body lid in the preferred embodiment.
Figure 6:
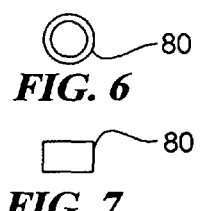
FIG. 6 is a top elevation view of the pod cushion in the preferred embodiment.
Figure 7:
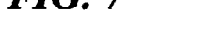
FIG. 7 is a front elevation view of the pod cushion in the preferred embodiment.
Figure 5:
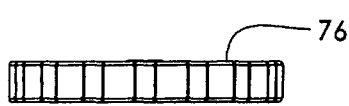
FIG. 5 is a front elevation view of the holder body lid in the preferred embodiment.

A holder body lid 76, illustrated in FIGS. 1-3 also separately depicted in FIGS. 4 and 5, is attached to the holder body 20 and incorporates an integral water inlet hollow duct 78 surrounded by a pod cushion 80, shown separately in FIGS. 6 and 7. The cushion 80 presses against the pod 70 when the lid 76 is attached to the holder body 20 without piercing the pod cover 72, as the cushion 80 is a hollow tube made of a soft resilient material and is longer in length than the lid integral water inlet hollow duct 78.

The holder body lid 76 includes a plurality of inwardly facing peripheral lips 82 which enter through the notches 24 in the flange 22 of the holder body 20 when the lid 76 is placed on top of the holder body 20. An attaching interface is created when the lid 76 is rotated away from the notches 24 until cam-ramps engage to tighten the lid 76 to the holder body 20. Stop 84 blocks the rotational movement beyond useful travel.

The holder body 20, body inner cup 32, pod ejector pin 52 and the holder body lid 76 are preferably ejection molded from a material including acrylic, polycarbonate, polystyrene, polysulfone, polyester sulfone, (PVC) polyvinylchloride, polyethylene and polyester. The holder body 20 and lid 76 are dimensionally compatible with a K-Cup® Filter Cartridge or other similar cartridges.

In operation when hot water is introduced into the pod 70 thru the duct 78 the water seeps through the pod's contents and a beverage is brewed. The brewed liquid then drains through the inner cup 32 into the holder body 20 and is discharged into a cup through the egress hole 30. Surface tension holds the brewed beverage to the stem of the ejector pin 54 permitting the brewed beverage to run down the shaft until it reaches the blunt end 64 where it drips into a cup without splatter. When the cup is removed, the spent pod 70 may be expelled, after the lid 76 is removed, by manually depressing the ejector pin 52.

When cleaning is necessary the inner cup 32 is removed by separating it from the body 20 and the ejector pin 52 is removed from the inner cup 32 by rotating the head 56 until the index mark 66 lines up with the short rib 48a in the inner cup 32.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

ELEMENT DESIGNATION

For Convenience of the Examiner, not Part of the Specification 10 single cup pod holder
20 holder body
22 flange (of 20)
24 notches (in 22)
26 upper surface (of 20)
28 base (of 20)
30 egress hole (in 28)
32 inner cup
34 flanged open top (of 32)
36 tapered sides (of 32)
38 upper portion (of 32)
40 bottom (of 32)
42 keyhole shaped opening (in 40)
44 drain hole (in 40)
45 raised seat (in 22)
46 inside surface (of 32)
48 ribs (on 46)
48a short rib (on 46)
50 outwardly extending portion (of 42)
52 pod injector pin
54 shaft (of 52)
56 head (of 52)
58 spacer (on 54)
60 grooves (in 54)
62 shaft outside surface
64 tapered shank blunt end (of 54)
66 indexing mark (on 56)
68 protrusion (on 54)
70 pod
72 permeable cover (of 70)
74 dry beverage media (in 70)
76 lid
78 water inlet hollow duct (in 76)
80 pod cushion (on 78)
82 inwardly facing peripheral lips (on 76)
84 stop (on 22)

The invention claimed is:

1. A pod holder for brewing a single cup beverage with infused heated water, which comprises;
   a holder body having a flange on an open top with the body tapered from an upper surface to a converging cone shaped base, with the base having an egress, hole therein,
   a body inner cup disposed within said holder body with the inner cup having a flanged open top with diametrically tapered sides, with the sides having a configuration to complement an inside surface of said holder body in a tight fit at an upper inside surface thereof, said body inner cup further having a diametrically tapered inside surface and a bottom surface, with said bottom surface having a centrally located keyhole shaped opening therein, wherein said body inner cup inside surface having a plurality of integral ribs extending from said flanged open top to said bottom surface, creating a fluid flow path therebetween,
   a pod ejector pin consisting of a shaft with a head and an ejector pin spacer positioned on the shaft contiguously engaging the head bottom with the shall positioned thru both said body inner cup keyhole shaped opening and said holder body egress hole, with the ejector pin spacer resting above said inner cup bottom surface,
   a single cup pod compressed into said body inner cup, and
   a holder body lid attached to the holder body, said lid having an integral water inlet hollow duct surrounded by a pod cushion, permitting the pod cushion to press against said when said lid is attached to said holder body, such that when hot water is introduced into the pod thru the hollow duct, the water seeps through the pod's contents and a beverage is brewed, the brewed liquid drains through the inner cup into the holder body and is discharged into a cup through the egress hole, with the spent pod expelled when the lid is removed and the ejector pin is manually depressed.

2. The pod holder for brewing a single cup beverage as recited in claim 1 wherein said plurality of integral ribs further comprise, one of said plurality of integral ribs designated as the short rib extends slightly beneath said inner cup open top, for indicating a position relative to an outwardly extending portion of said keyhole shaped opening on said bottom, allowing said pod ejector pin to be positioned in said inner cup for insertion and removal.

3. A pod holder for brewing a single cup beverage with infused heated water, which comprises;
   a holder body having a flange on an open top with the body tapered from an upper surface to a converging cone shaped base, with the base having an egress hole therein,
   a body inner cup disposed within said holder body with the inner cup having a flanged open top with diametrically tapered sides, with the sides having a configuration to complement an inside surface of said holder body in a tight fit at an upper inside surface thereof, said body inner cup further having a diametrically tapered inside surface and a bottom surface, with said bottom surface having a centrally located keyhole shaped opening therein, pod ejector pin consisting of a shaft with a head and an ejector pin spacer positioned on the shaft contiguously engaging the head bottom with the shaft positioned thru both said body inner cup keyhole shaped opening and said holder body egress hole, with the elector pin spacer resting above said inner cup bottom surface, wherein said pod ejector pin shaft having a tapered shank blunt end for creating a splatter free flow for brewed liquid when flowing, without restraint, to a cup below said pod holder and for user comfort when manually ejecting said pod, a single cup pod compressed into said body inner cup, and a holder body lid attached to the holder body, said lid having an integral water inlet hollow duct surrounded by a pod cushion, permitting the pod cushion to press against said pod when said lid is attached to said holder body, such that when hot water is introduced into the pod thru the hollow duct, the water seeps through the pod's contents and a beverage is brewed, the brewed liquid drains through the inner cup into the holder body and is discharged into a cup through the egress hole, with the spent pod expelled when the lid is removed and the ejector pin is manually depressed.

4. The pod holder for brewing a single cup beverage as recited in claim 3 wherein said pod ejector further comprises;

an indexing mark in the form of a raised line formed integrally on said head of said pod ejector, said pod ejector shaft having an outwardly extending protrusion for retention between said inner cup and said holder body, said outwardly extending protrusion further having a configuration that permits removal through said centrally located keyhole shaped opening in said body inner cup.

5. A pod holder for brewing a single cup beverage with infused heated water, which comprises;

a holder body having a flange on an open top with the body tapered from an upper surface to a converging cone shaped base, with the base having an egress hole therein, a body inner cup disposed within said holder body with the inner cup having a flanged open top with diametrically tapered sides, with the sides having a configuration to complement an inside surface of said holder body in a tight fit at an upper inside surface thereof, said body inner cup further having a diametrically tapered inside surface and a bottom surface with said bottom surface having a centrally located keyhole shaped opening therein, a pod elector pin consisting of a shaft with a head and an elector pin spacer positioned on the shaft contiguously engaging the head bottom, with the shaft positioned thru both said body inner cup keyhole shaped opening and said holder body egress hole, with the elector pin spacer resting above said inner cup bottom surface, a single cup pod compressed into said body inner cup, a holder body lid attached to the holder body, said lid having an integral water inlet hollow duct surrounded by a pod cushion, permitting the pod cushion to press against said pod when said lid is attached to said holder body such that when hot water is introduced into the pod thru the hollow duct, the water seeps through the pod's contents and a beverage is brewed, the brewed liquid drains through, the, inner cup into the holder body and is discharged into a cup through the egress hole, with the spent pod expelled when the lid is removed and the elector pin is manually depressed, and wherein said holder body lid having a plurality of inwardly facing peripheral lips and said holder body flange having notches configured to mate with the inwardly facing peripheral lips.

6. The pod holder for brewing a single cup beverage as recited in claim 5 wherein said holder body egress hole in said base is defined as having an unobstructed opening there through.

7. The pod holder for brewing a single cup beverage as recited in claim 5 wherein said holder body flange further comprises an inner radial raised seat configured to mate with said body inner cup flanged open top.

8. The pod holder for brewing a single cup beverage as recited in claim 5 wherein said ejector pin spacer further comprises a hollow tube of resilient material.

9. The pod holder for brewing a single cup beverage as recited in claim 5 wherein said single cup pod further comprises a permeable cover with a dry beverage medium inside.

10. The pod holder for brewing a single cup beverage as recited in claim 5 wherein said holder body lid pod cushion further comprises a hollow tube of resilient material longer in length than said lid integral water inlet hollow duct.

11. The pod holder for brewing a single cup beverage as recited in claim 5 wherein said holder body, said body inner cup, said pod ejector pin and said holder body lid are ejection molded from a material selected from the group consisting of acrylic, polycarbonate, polystyrene, polysulfone, polyester sulfone, polyvinylchloride (PVC), polyethylene and polyester.

\* \* \* \* \*